(12) United States Patent  
Bennett

(10) Patent No.: US 8,818,354 B1  
(45) Date of Patent: Aug. 26, 2014

(54) SYSTEMS AND METHODS FOR MOBILE STATION VALIDATION

(75) Inventor: Carlton L. Bennett, Bronx, NY (US)

(73) Assignee: Cellco Partnership, Basking Ridge, NJ (US)

( * ) Notice: Subject to any disclaimer, the term of this patent is extended or adjusted under 35 U.S.C. 154(b) by 312 days.

(21) Appl. No.: 12/491,861

(22) Filed: Jun. 25, 2009

(51) Int. Cl.
| | |
|---|---|
| H04W 24/00 | (2009.01) |
| H04L 12/26 | (2006.01) |
| H04L 1/00 | (2006.01) |
| H04J 3/14 | (2006.01) |
| H04J 1/16 | (2006.01) |
| G08C 15/00 | (2006.01) |
| G06F 11/00 | (2006.01) |
| G01R 31/08 | (2006.01) |

(52) U.S. Cl.
USPC .......................................... 455/423; 370/241

(58) Field of Classification Search
USPC ........ 455/422.1, 423, 424, 425, 426.1, 432.1, 455/433, 435.1, 435.2, 435.3
See application file for complete search history.

(56) References Cited

U.S. PATENT DOCUMENTS

| | | | |
|---|---|---|---|
| 6,424,837 B1 | 7/2002 | Hall et al. | |
| 7,024,161 B1* | 4/2006 | LaMedica, Jr. | ............ 455/67.11 |
| 7,627,312 B2* | 12/2009 | Varadarajan et al. | .......... 455/423 |
| 2004/0203728 A1* | 10/2004 | Schwinke et al. | ............ 455/425 |
| 2008/0254790 A1 | 10/2008 | Baldridge et al. | |
| 2009/0047925 A1 | 2/2009 | Rahman | |
| 2009/0305722 A1* | 12/2009 | Tiedeman et al. | ......... 455/456.1 |
| 2010/0323689 A1* | 12/2010 | Topaltzas et al. | ............. 455/425 |

* cited by examiner

*Primary Examiner* — Kent Chang  
*Assistant Examiner* — Nathan Brittingham

(57) ABSTRACT

Systems, methods, and an article of manufacture for performing a validation test of a model of a mobile station for operability of the mobile station to communicate via a wireless communication network are shown and described. After receiving one or more call parameters at a mobile station, the mobile station automatically executes a test call an indicated number of times according the received call parameters. One or more test parameters are recorded during the testing. The recorded results can be displayed on the mobile station, for example, at the end of the test procedure.

26 Claims, 4 Drawing Sheets

SYSTEMS AND METHODS FOR MOBILE STATION VALIDATION

TECHNICAL FIELD

The present subject matter relates to testing operational characteristics of a mobile station. In particular, the subject matter relates to systems and methods for performing a validation test of a model of a mobile station for operability of the mobile station to communicate via a wireless communication network.

BACKGROUND

In recent years, mobile wireless communications have become increasingly popular. Initial implementations of mobile wireless communications, for example in the form of cellular telephone networks, supported circuit switched voice communication services. Mobile voice telephone communications is now ubiquitous in many countries, and mobile services are replacing fixed landline service even for traditional voice telephone calls. However, for many years now the mobile service offerings have extended far beyond the traditional voice telephone call model. To meet the increased public interest in mobile services, the device manufacturers are continually developing and bringing to market. However, the new models of mobile stations must be compatible with and/or capable of operation through the mobile wireless communication network of one or more carriers offering the mobile service. As a result, a carrier often will need to certify each new model of a mobile station intended to operate via the carrier's network. This typically entails testing one or more samples of the new device.

The carriers have a number of different tests that they perform on new devices to determine that the mobile stations are operable on their networks, for certification purposes or the like. Some of these test procedures involve dialing and monitoring of results of the dialed calls from a mobile station. For example, modern mobile stations typically include global position satellite (GPS) receivers which are used for emergency calls (e.g. 911) or for location based services (LBSs), and mobile station certification often requires test calls to 911 or the like to determine the dialing and GPS location functions of the mobile station operate as expected/necessary. One way to test these capabilities has involved manual dialing, essentially, a technician manually dials 911 or some other number that functions similar to dialing 911 and records the call results (completion, dropped call, etc.) as seen from the perspective of the mobile station. Results data can also be obtained off-line (typically next day) from other elements involved in the call processing, such as the logs of the position determining entity (PDE) or the public safety answering point (PSAP). However, manually dialing 911 or the like a substantial number of times (e.g. 50 or more) to obtain an adequate statistical representation of device performance is time consuming and labor intensive.

There have been personal computer (PC) based products to automate some of the device test functions. For example, Qualcomm offers a Call Manager product that relies on a USB cable connection of a mobile station to a PC, and a program in the PC that drives the phone to make the calls. However, GPS measurements are sensitive to a number of environmental factors that impact the ability of the device to the receive the signals from an adequate number of the GPS satellites. Universal Serial Bus (USB) cable connection and/or operation of a liquid crystal display (LCD) monitor on the nearby PC may actually cause interference with some functions of the mobile station, such as the GPS satellite signal reception. Such interference may compromise the validity of the PC driven device testing for 911 or other calls that involve a GPS location determination.

Thus, a need exists for systems, methods, and articles of manufacture that automate the device test without beginning tethered to a PC via a cable or the like.

SUMMARY

The teachings herein alleviate one or more of the above noted problems with the known methods for validation testing of a mobile station. In various instances, the mobile station is programmed automatically to perform the required testing without being tethered to a PC via a cable. Thus, the interference caused by the tethering is alleviated.

In one instance, the disclosure relates to a method of performing a validation test of a model of a mobile station for operability of the mobile station to communicate via a wireless communication network. The method includes receiving, at a mobile station of the model, a plurality of call parameters from an operator of the mobile station and automatically executing, by the mobile station, the test call the indicated number of times according the received call parameters. The call parameters can include, but are not limited to, a connection duration, a destination telephone number, and indication of a number of times to perform a test call. The method also includes recording one or more test parameters during the execution of the indicated number times of execution of test call and reporting the one or more recorded test parameters.

In some instances, the recording test parameters includes recording one or more of parameters selected from the group consisting of: whether each test call failed, the number of test calls attempted, a time a first of the number of test calls originated, a time when a last of the number of test calls originated, and whether any of the number of test calls dropped. In various instances, the test parameters are recorded by the mobile station. Of course other network elements can also record the test parameters. In some cases, the recorded test parameters are received from a network element prior to be displayed on the mobile station.

In some cases, the destination telephone number is associated with an emergency service (e.g., 911 services). During the test calls, the mobile station communicates to a network element of the wireless communication network, global positioning system (GPS) related data for use in determining the location of the mobile station when the call is connected.

In some cases, reporting includes displaying the recorded parameters on the display of a mobile station. In addition, the recorded parameters can be communicated to other network elements for further use and analysis. In some cases, an application is received (e.g., downloaded) to the mobile. The application is configured to receive the test parameters and automatically execute the call the indicated number of times.

In some instances, the disclosure is direct to a of performing a validation test of a model of a mobile station for operability of the mobile station to communicate via a wireless communication network. The method includes receiving, at a mobile station of the model, a plurality of call parameters from an operator of the mobile station, the call parameters including at least a connection duration, a destination telephone number, and an indication of a number of times to perform a test call, automatically executing, by the mobile station, the test call the indicated number of times according the received call parameters, and recording one or more test parameters during the execution of the indicated number times of execution of the test call. The method also includes determining the location of the mobile station, by an element of the wireless communication network, during the indicated number times of execution of the test call, recording the determined location of the mobile station during the indicated number of times of execution of the test call, and reporting the determined location and the recorded test parameters.

In some case, a position determining entity determines and records the location of the mobile station under test.

In another instance, the disclosure is directed to a mobile communications network that includes a traffic network and one or more mobile stations. The traffic network is configured to support communications. The mobile stations are in communication with the traffic network. The mobile stations are configured to receive a plurality of call parameters from an operator of the mobile station, automatically executing the call the indicated number of times according the received call parameters, recording one or more test parameters during the execution of the indicated number of calls, and reporting the one or more recorded test parameters.

In some instances, the network also includes a position determining element (PDE) or other network element in communication with the traffic network that also records one or more of the test parameters during the execution of the indicated number of calls.

In some instances, the mobile stations are configured to communicate the recorded test parameters to other network elements. Also, the system can include a public service answer point (PSAP) in communication with the network. The PSAP is configured to receive the automatically executed call from the mobile station.

Other concepts relate to unique software for implementing forward of a messaging service message. A software product, in accord with this concept, includes at least one machine readable medium and information carried by the medium. The information carried by the medium may be executable program code.

In another instance, the disclosure is directed to an article of manufacture. The article of manufacture includes a machine readable storage medium and executable program instructions embodied in the machine readable storage medium. When the medium is executed by a programmable system of a mobile station it causes the system to perform functions that provide validation testing of the mobile station for operability of model of a mobile station to communicate via a wireless communication network. The functions include, but are not limited to, receiving a plurality of call parameters from an operator of the mobile station, automatically executing the test call the indicated number of times according the received call parameters, recording one or more test parameters during the execution of the indicated number times of execution of test call, and report the one or more recorded test parameters.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to performing one or more validation tests of a model of a mobile station. Prior to certifying a new model of a mobile station as ready for use on a mobile communications network, that model of mobile station must perform up to certain standards. One example of a validation procedure is known as a global position system (GPS) field test. This test includes exercising the mobile station's GPS determination accuracy when making fixes during an emergency (e.g., 911) call. Thus, prior to certifying a new model of mobile station for use on a carrier's network, the calling capability of the mobile station needs to be tested for compatibility with the network, and the GPS location related functionality needs to be tested and confirmed as accurate according industry standards.

Figure 1:
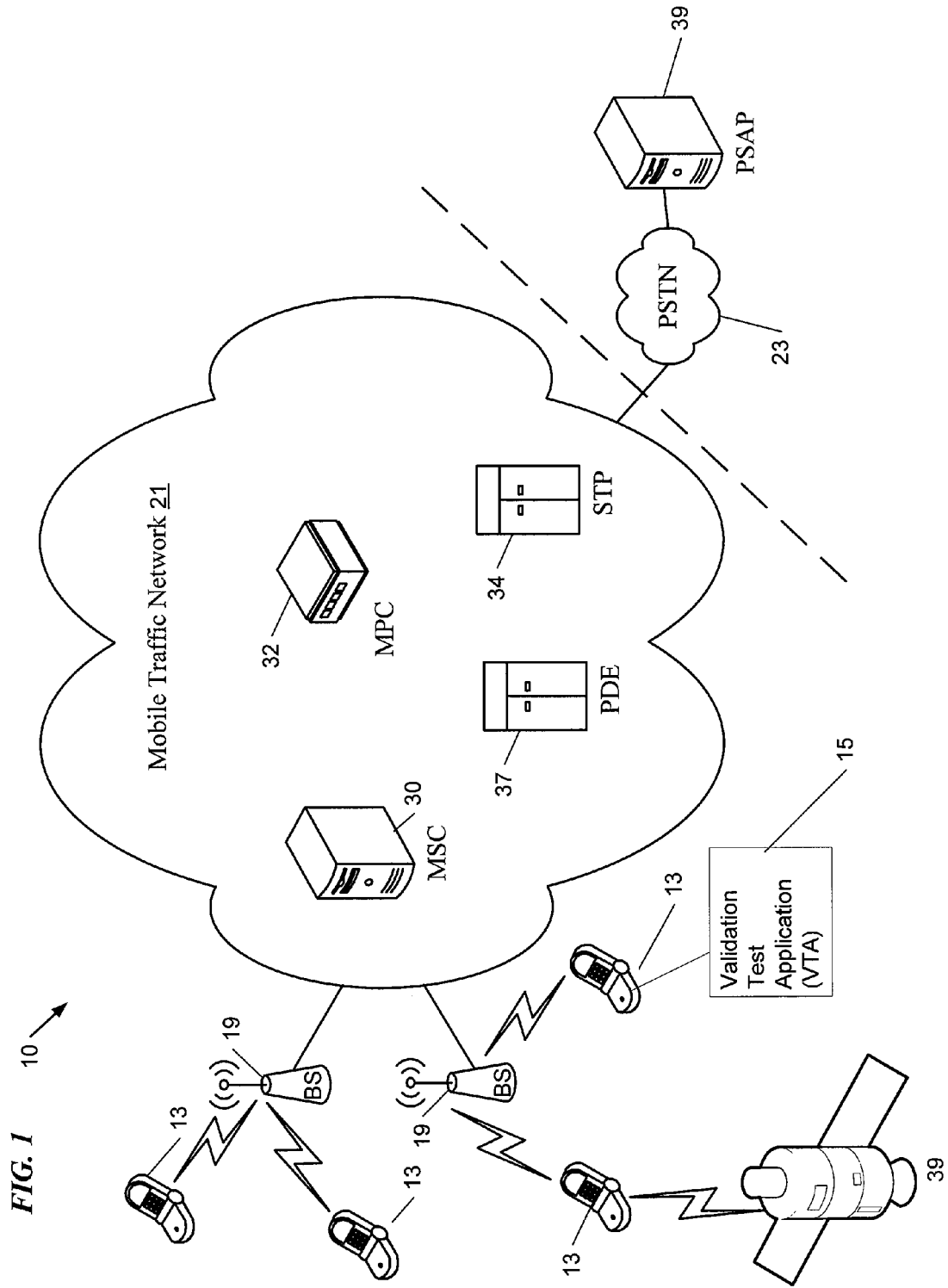
FIG. 1 is a functional block diagram that depicts various components of an exemplary mobile communications network.

Reference now is made in detail to the examples illustrated in the accompanying drawings and discussed below. FIG. 1 illustrates a mobile communication network 10 as may be operated by a carrier or service provider to provide a wide range of mobile communication services (e.g., LBS and E-911 services) and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations outside the mobile communication network 10.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may be capable of conventional voice telephone communications and data communications. A variety of different types of mobile stations supporting such communications are widely available.

For purposes of later discussion, several mobile stations 13 appear in the drawing, to represent examples of the mobile stations that may receive various services via the mobile communication network 10. Today, mobile stations typically take the form of portable handsets, smart-phones or personal digital assistants, although they may be implemented in other form factors. At least one of the mobile stations 13, for example, intended for testing relative to a particular model of mobile station, can include a validation test application (VTA) 15, that can be downloaded to the mobile station 13 or added thereto in some other way.

The validation test application 15 aids in certifying a new model of the mobile station 13 for use with the network 10. The validation test application 15 can include functionality that untethers the mobile station 13 from a PC during the GPS field validation test or other tests. The validation test application 15 can be configured to execute on many different types of mobile stations 13. That is, the VTA can be programmed to execute on a binary runtime environment for mobile (BREW-based) mobile station, a Windows Mobile based mobile station, or RIM based mobile station. As an operational summary, the validation test application 15 automates certain aspects of the GPS field test call functionality of the mobile station 13. Using the validation test application 15 can improve the speed at which the traditional test processes are executed, it can reduce human errors in conducting the test, and, as discussed in more detail below, the status of the test that was conducted is displayed on the mobile station 13 after the test is completed. Further functionality and advantages provided by the validation test application 15 are discussed below in more detail.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13 will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, when the mobile stations are within range. Each base station typically includes a BTS coupled to several antennae mounted on a radio tower within a coverage area often referred to as a "cell." The BTS is the part of the radio network that sends and receives RF signals to/from the mobile stations 13 that the base station 19 currently serves.

The radio access networks also include a traffic network represented generally by the cloud at 21, which carries the user communications for the mobile stations 13 between the base stations and other elements with or through which the mobile stations communicate. In some examples, the mobile traffic network 21 includes network elements that support E-911 and LBS services such as mobile switching centers (MSCs) 30, signal transfer points (STP) 34, mobile positioning center (MPC) 32, position determining entity (PDE) 37 and public-safety answering point (PSAP) 39. The network can also include other elements, which are not shown, that support functionality other than E-911 service. Examples include, but are not limited to, message centers (MCs), home location registries (HLRs), and other network elements such as wireless interne gateways (WIGs), and visitor location registers (VLRs) (not shown). Other individual elements such as switches and/or routers forming the traffic network 21 are omitted here form simplicity. Various combinations of the network elements cooperate to provide the various messaging service message forwarding capabilities discussed herein. It is understood that the various network elements can communicate with each other and other aspects of the mobile communications network 10 and networks (e.g., PSTN and Internet) either directly or indirectly.

The mobile switching center (MSC) 30 is responsible for managing communications between the mobile station and the other elements of the network 10. In addition, the MSC 30 is responsible for handling voice calls and messaging service message request as well as other services (such as conference calls, FAX and circuit switched data). The MSC 30 sets up and releases the end-to-end connection, handles mobility and hand-over requirements during the call. The MSC 30 is sometimes referred to as a "switch". The MSC 30 manages the cell sites, the voice trunks, voicemail, and SS7 links.

The PDE 37 is a network element that manages the position or geographic location determination of each mobile station 13. The exemplary network 10 utilizes an assisted GPS approach to the determination of mobile station location, in which the mobile station 13 takes measurements of signals from a number of GPS satellites 39 and interacts with the PDE 37 to process those measurements so as to determine the latitude and longitude (and possibly altitude) of the current location of the mobile station 13.

The PDE system 37 is essentially a general purpose programmable device with an interface for data communication via the network 10 running server software and running programming for implementation of the PDE functions, such as device authentication, data cache and processing queue management. The PDE 37 stores (e.g. in cache memory) or has access to a complete and up to date set of the satellite data for the constellation of GPS satellites 39 needed to allow computation of position based on pseudorange measurements of satellite signals by mobile stations 13. The data may include that associated with the entire constellation but will at least include the data for the satellites expected to be broadcasting into the geographic region serviced by the network 10.

When a mobile station 13 attempts a GPS position fix, the mobile station 13 provides information allowing the PDE 37 to perform a pre-fix. Typically, the mobile station 13 will provide data identifying the base station through which it is receiving service (and possibly the serving sector). In some implementations, the PDE 37 may receive data regarding several base stations/sectors and signal strengths thereof, for trilateration. The PDE 37 uses information about base station location(s) to process the data received from the mobile station so as to determine a region (e.g. area of the cell or sector, or a general area triangulated based on signals from several base stations) that the mobile station 13 is likely located within. The PDE 37 then uses the pre-fix location to parse the satellite data down, to assistance data that the mobile station 13 at the particular location needs in order to take GPS readings. The PDE 37 sends the parsed satellite data to the mobile station 13, for use in taking measurements of signals from appropriate satellites 39. The GPS assistance data may contain selected satellite almanac, satellite visibility, Doppler and clock correction information.

The mobile station 13 will, in turn, use this information (also known as acquisition assistance records) to take multiple satellite pseudorange measurements. Depending on the device/network configuration, the mobile station 13 or the PDE 37 can then calculate a final fix using these pseudorange measurements. The final fix computation provides latitude and longitude (and possibly altitude) coordinates for the current location of the mobile station 13. If the mobile station 13 has full GPS computation capability, the station 13 would know its current latitude and longitude and would communicate that data to the PDE 37 through the network 10. In many cases, however, the mobile station 13 has only measurement capability, and the station forwards the measurement data to the PDE 37 to determine the final fix. In either case, the GPS processing leads to a situation in which the PDE 37 knows the latitude and longitude of the mobile station 13. If necessary, the PDE 37 can provide coordinates to the mobile station 13 or to another element that needs or has requested the location of the particular mobile station 13.

The traffic network portion 21 of the mobile communication network 10 connects to a public switched telephone network 23. This allows the network 10 to provide voice grade call connections between mobile stations and regular telephones connected to the PSTN 23. To this end, the network 10 also includes one or more STP 34, typically deployed as mated pairs of STPs 34, coupled to MSC 30 and to elements of the PSTN 23 through signaling system number 7 ("SS7") link sets. The STPs 34 and the links thereto provide a signaling network, for use in managing call traffic. The network 10 may enable communication with a Public-Safety Answering Point ("PSAP") 39.

The PSAP 39 includes a server, typically implemented in a call center responsible for handling emergency calls such as calls for police, ambulance and firefighter services. A PSAP 39 normally receives voice telephone calls. However, discussion here focuses on location related functionality, including that of the PSAP server 39. Most PSAPs 39 are capable of locating callers using landline phones and many can handle mobile phones if the mobile service provides for such capability.

To comply with the 911 mandate, the mobile service providers should provide a mechanism for locating subscribers within their respective mobile network. The 911 mandate requires that the mobile service providers locate their respective subscribers within fifty (50) meters sixty-six percent (66%) of the times and locate their respective subscribers within one-hundred-fifty (150) meters ninety-five (95%) of the time. The mandate is subject to change and may be amended to require a more accurate position determination.

For location based services, including mobile station 13 location during an emergency call, network 100 also includes MPC 32 and PDE 37. In assisted GPS (global positioning system) type deployments, for example, PDE 37 provides data to mobile station 13 to expedite satellite acquisition; and it may determine the actual latitude and longitude (final fix) of mobile station 13 based on GPS measurements taken by mobile station 13 at the PDE's request.

As shown above, the process of locating mobile device 13 involves several elements. In practice, MSC 30 requests an instruction for routing to the closest PSAP 39; and in response MPC 32 or other similar element requests location information for a particular mobile station from PDE 37. The MSC 30 serving mobile device 13 delivers messages to/from mobile device 13, including those exchanged with PDE 37, which provides the final fix to MPC 32 for further processing, e.g. to determine the closest PSAP 39 and for delivery of mobile device location to that PSAP.

With that overview of the system, it may be helpful now to consider a high-level discussion of an example of validating a model of a mobile station 13. The validation relates to a certain operational aspect of the mobiles station 13, such as the ability to determine the location of the mobile station 13 during an emergency call. In order to confirm this operational aspect of the mobile station 13 is within the required specifications, the mobile station 13 is tested repeatedly and location determinations are made and recorded with respect to repeated test calls. The determinations are compared with the known location of the mobile station 13 during the testing to confirm that the determined location is within the specified tolerance. The location determinations can be stored in the PDE and then compared with the known location of the device during the testing.

In a typical 911 call, the mobile station 13 is ultimately connected with the PSAP 39. However, it is not a good use of emergency resources to respond to test calls. Thus, the mobile communications network 10 can include a second emergency trunk (not shown) associated with a telephone number other the 911 (e.g., 922). This alternate emergency number and trunk are used during the validation testing of the mobile station. It should be understood that a telephone number other than 922 can also be used.

As an operational summary, the validation test application 15 executes on the mobile station 13. The VTA 15 cause the mobile station 13 to automatically dial a specified telephone number (e.g., 922) a specified number of (e.g., fifty times). When the mobile station 13 connects to the network 10, (the details of call establishment are known and therefore not repeated herein) the call is maintained for a specified duration (e.g., twenty seconds). These parameters are, in some instances, input by the user of the mobile station 13 under test. That is, the VTA 15 parameters are configurable. This provides flexibility in mobile station 13 validation testing. During the period the call is connected, the GPS location of the mobile station 13 under test is determined using the above-described methods or other know methods.

As shown by the discussion above, the repeated test calls for certification testing or the like are implemented in one or more configured mobile stations of the particular model under test. Those skilled in the art should be quite familiar with the structure, programming and operation of a variety of different mobile stations that might be tested utilize the approach discussed herein. However, for general completeness and to perhaps help some readers to appreciate an actual implementation of the testing technique, it may be helpful to briefly consider a high level example of a particular mobile station device.

Figure 2:
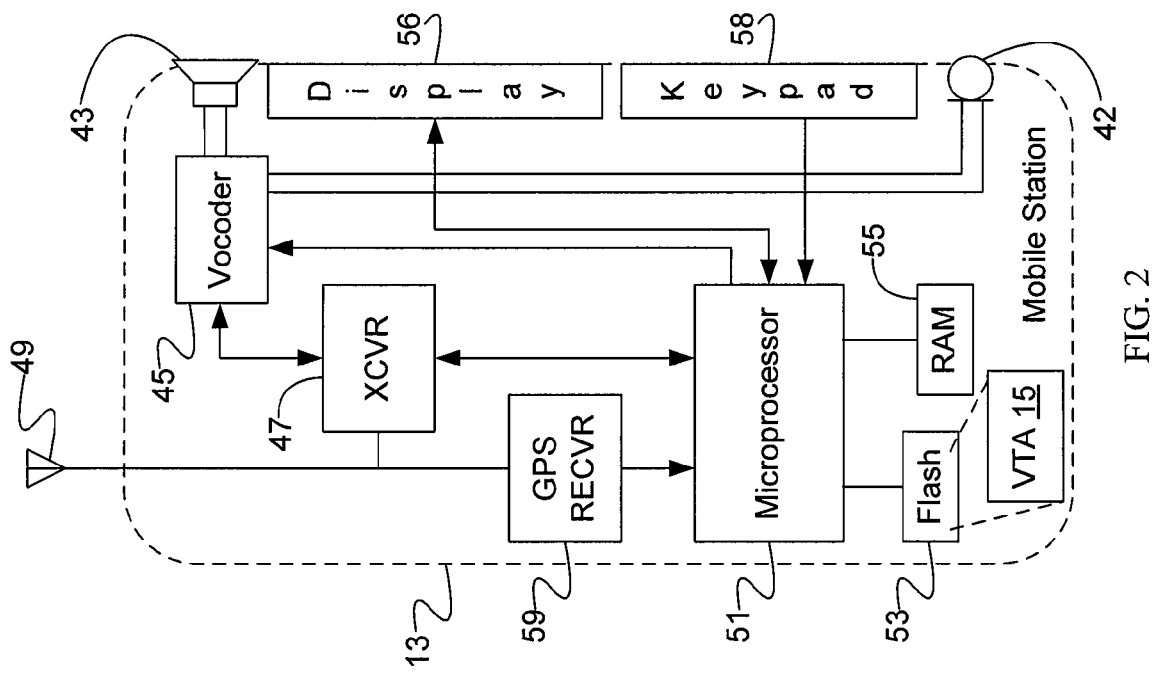
FIG. 2 is a simplified functional block diagram of a mobile station.

With reference to FIG. 2 a block diagram illustrating a GPS enabled mobile station 13 is shown and described. Although the station 13 may be incorporated into a vehicle mounted mobile unit or into another device, such as a portable personal computer or PDA, for discussion purposes the illustration shows the station 13 in the form of a handset. The handset embodiment of the mobile station 13 functions as a digital wireless telephone station. For that function, the station 13 includes a microphone 42 for audio signal input and a speaker 43 for audio signal output. The microphone 42 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13 also includes a digital transceiver (XCVR) 47. The concepts discussed here encompass embodiments of the station 13 utilizing any digital transceivers that conform to current or future developed digital wireless communication standards.

For example, the transceiver 47 could be a TDMA or GSM unit designed for cellular or PCS operation. In the present embodiments, the digital transceiver 47 is a CDMA transceiver compatible with operation via an IS-95 network or a 1x network, to provide both voice and packet data communications. Also, the mobile station 13 may utilize either or both of 3GPP2 (1XRTT and EVDO) technologies and 3GPP (LTE/GSM/UMTS) technologies. In other Multimode transceivers also may be used.

The transceiver 47 provides two-way wireless communication of information, such as vocoded speech samples and/or digital message information. The transceiver 47 also sends and receives a variety of signaling messages in support of the various services provided via the station 13 and the network 10. Communications via the transceiver 47 and the antenna 49 may include various messages related acquisition assistance, position determination and related location based services. The transceiver 47 connects through RF send and receive amplifiers (not separately shown) to an antenna 49. In the example, the transceiver 47 is configured for RF communication in accord with a digital wireless protocol. The station 13 may include one or more additional transceivers, for example, for operation in an analog mode or in accord with an alternative digital standard.

A microprocessor 51 serves as the programmable controller in that it controls all operations of the mobile station 13 in accord with programming that it executes. The mobile station 13 also includes flash type program memory 53 and/or a non-volatile random access memory (RAM) 55, for storing various software routines and mobile configuration settings, such as mobile identification number (MIN), etc. In a present implementation, the flash type program memory 55 stores an operating system, device driver software, call processing software and vocoder control software; and the memory may store any of a wide variety of other applications, such as client browser software and short message service software.

Of note for purposes of this discussion, the stored program software will also include a validation test application (VTA) 15. The VTA 15 provides functionality to perform aspects of a GPS field test for the mobile station 13. The VTA 15 can be thought of as a location based service (LBS) application that automatically obtains the station location information for communication to a PSAP 39, if needed. In the implementation of FIG. 1, the location based programming would include the MPC protocol client, for interaction with the PDE 37 to determine mobile station position as well as BREW extensions for other client programs. The stored programming may further include other applications relating to GPS based position determination and may include one or more additional location based service applications that utilize determined position information.

In one instance, the validation test application 15 is downloaded from one of the elements to the mobile station 13 and stored therein. Another approach includes downloading the programming over the air, from a third party server (not shown), from a OTAF provisioning system (not shown) or the like, The VTA 15 can also be loaded on the mobile station 13 by connecting the mobile station 13 to a personal computer (PC) and transferring the VTA 15 from the PC to the mobile station 13 using known techniques.

The memories 53, 55 also store various data, such as telephone numbers and server addresses and data input by the user. For example, the memory 53 and/or the memory 55 will at various times store coordinates obtained from the GPS processing. In addition, the memories 53, 55 will store parameters associated with the VTA 15 there are inputted from the user of the mobile station 13 and information related to the results of the execution of the VTA 15. For example, the memory can store information related to whether or not each test call failed, the number of test calls attempted, a time a first of the number of test calls originated, a time when a last of the number of test calls originated, and whether or not any of the number of test calls dropped.

As shown, the digital telephone handset 13 includes a display 56 for displaying messages, menus or the like, call related information dialed by the user, calling party numbers, the results from the execution of the VTA 15, etc. For the VTA 15, the display 56 provides output of text and/or image information related to the parameters of the test application and the results of executing the VTA 15. If the station runs other location based service applications, the display 56 may provide other information regarding the determined location and/or surrounding areas, e.g. LAT/LON data, map displays and possibly displays of information about items of interest in and around the determined location. A keypad 58 enables dialing digits for voice and/or data calls and generating selection inputs keyed by the user based on any displayed menu such as the inputs for the VTA 15. The display 56 and keypad 58 are the physical elements providing a textual or graphical user interface. In addition to normal telephone related input/output, these elements are also used for display of menus and other information to the user and user input of selections, for the VTA 15 and any other applications relating to determining position and providing ancillary position specific information for a location based service. Of course other user interface elements may be used, such as a stylus and touch sensitive display screen, as in a PDA or mobile smartphone.

For position determination and associated location based services, the mobile station 13 also includes a GPS receiver 59. Under control of the microprocessor 51, the GPS receiver 59 receives and processes signals from one or more satellites of the constellation 21 of GPS satellites. From its processing, the GPS receiver 59 supplies GPS data to the microprocessor 51, such as pseudorange measurements and associated PN codes for measured satellite signals. Associated computations may be performed in the microprocessor or by a processor or the like included in the GPS receiver.

If the receiver 59 or the combination of the receiver and the microprocessor 51 are configured to provide a fully functional GPS position determination device, the station 13 could process the pseudorange measurements, absolute times of transmission of the GPS signals, and the satellite position data to compute the station's latitude and longitude. However, because of size/space/cost constraints on the design of the mobile stations 13, the GPS receiver 59 in the mobile station 13 often will have only reception capability, not the full GPS processing capability to resolve position from signals received from the satellites 39. Hence, the receiver 59 supplies the GPS measurement and code data to the microprocessor 51, which in turn formats the data and sends it to the PDE 37 using the wireless transceiver 47. The PDE 37 performs the data processing necessary to determine the latitude and longitude of the station 13 and transmits that data where needed, which in some cases will be back to the mobile station 13 for further processing.

Figure 3:
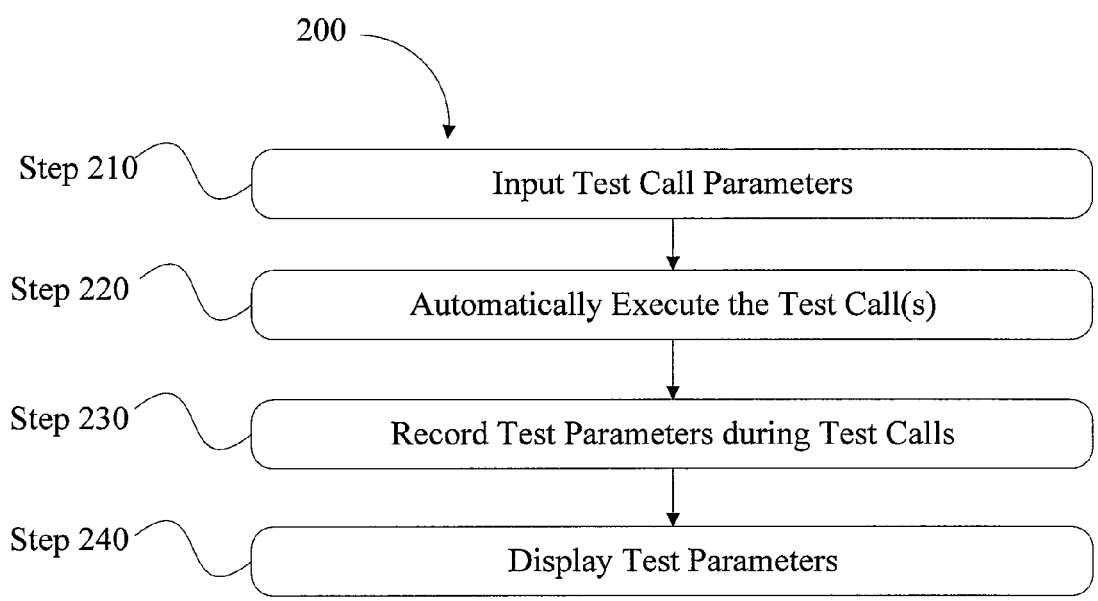
FIG. 3 is a flow chart depicting a method of validating a model of a mobile station.

The structure and operation of the mobile station 13, as outlined above, were described to by way of example, only. Using a mobile station 13 and the network of FIG. 1, as an example, it may be helpful now to consider the flow chart of FIG. 3 that describes in somewhat more detail some aspects of the VTA 15, as it may prove helpful in understanding steps involved in an exemplary process of validating one or more operational characteristics of a model of a mobile station 13 for use within the mobile communications network 10.

The VTA 15, when executed by the microprocessor 51 of the mobile station 13 causes the mobile station to perform a method 200 that relates to performing a validation test of a model of a mobile station 13 for operability of the mobile station to communicate via a wireless communication network. The method 200 includes receiving (step 210) input parameters (e.g., call parameters) from an operator (e.g., user) of the mobile station. The call parameters can include, but are not limited to, a connection duration, a test telephone number, an amount of time paused between each call, and an indication of the number of times to perform the test call. Various combinations of these parameters can be used depending on the validation application being performed.

In a GPS field validation test example, the VTA 15 may require that the mobile station 13 call a number that is related to emergency services such as the E-911 services fifty times in order to confirm that the mobile station 13 is accurately reporting the GPS location of the mobile station. Each of the test calls to the emergency service should persist for a specified duration (e.g., thirty seconds). The duration, in the case of the GPS field test, should be long enough to allow the mobile station 13 alone or in combination with the other elements of the mobile communication network 10 to determine the GPS location of the handset and communicate that location to the PDE 37 or other network elements.

Instead of actually calling 911 the specified number of times, the mobile station 13 can call another telephone number (e.g., 922) the specified number of times. As can be imagined, actually calling 911 fifty times during the course of a testing of a model of a mobile station 13 could cause problems with the emergency response system. Thus, it is better to use a duplicate trunk that does not actually send each call to a PSAP 39, but still causes the mobile station 13 to determine its GPS coordinates as if the mobile station 13 was making an actual emergency call. To implement this approach, the 922 destination dialing number would be part of the VTA 15 and/or one of the input parameters received in step 210.

Although described as being input through the mobile station 13, the call parameters can also be received from a message (e.g., an email or SMS message) communicated to the mobile station 13 the network, while the station 13 executing the VTA 15. The call parameters can be extracted from the message and input into the VTA 15. Such a message may also activate the VTA 15, to cause the station to initiate the test procedure/calls.

As mentioned above, the mobile station 13 is not tethered to a PC via a cable as in previous automated test scenarios. Thus, the mobile station 13 automatically executes (step 220) the test call the indicated number of times received as part of the call parameters. In other words, the mobile station 13 executes the call the specified number of times without interaction from other sources.

During the execution of the VTA 15, one or more test parameters that relate to characteristics of the call are recorded (step 230). Certain test parameters can be recorded by the mobile station 13 while other test parameters can be recorded by other network elements such as the PDE 37. Examples of test parameters that can be recorded include, but are not limited to, the number of test call attempted, the time stamp of each of the calls, the whether a call was dropped, whether the call failed, the duration of each, and many others. For example, each of the times that the mobile station makes a 922 call, the microprocessor 51 detects that another test call is made and increases the number of calls made thereby reducing the number of test calls remaining. The microprocessor also record some parameters about each test call and stores those parameters in memory 55. For example, the microprocessor can record whether the call connected, failed, or dropped. Also, the beginning time and end time of each call can be recorded in the memory 55. As it runs through the specified number of calls, the mobile station therefore compiles overall results data in its memory. In addition to these parameters, the GPS coordinates of the mobile station 13 can be determined and stored at the PDE 37 or other network element of the mobile communication network 10.

The location determinations can be retrieved from the PDE 37 using known methods. These records can be compared to the known location of the mobile station 13 during the execution of the VTA 15. This comparison can be used to determine whether the model of mobile station 13 is accurately reporting its location during an emergency call.

At the conclusion of the specified number of test calls, one or more of the recorded test parameters are displayed (step 240) on the mobile station. That is, after the specified number of calls are made certain of the recorded test parameters are displayed on the mobile station 13. In one example, the displayed recorded test parameters include, but are not limited to, the number of test calls attempted, the time stamp of the first call, the time stamp of the last test call, the number of dropped test calls, and the number of failed test calls.

The displayed parameters can be retrieved from the memories 53, 55 of the mobile station 13, from other network elements of the mobile communications network 10, or some combination thereof. For example, data from the network elements can be communicated to the mobile station 13 using known transfer methods such as SMS messages, e-mail, data packet transfers using protocols such as TCP/IP. In addition, some processing of the recorded test parameters can occur prior to their display. For example, an aggregation of the number of failed and dropped calls can occur if these totals are not determined during the execution of the VTA 15.

Figures 4, 5:
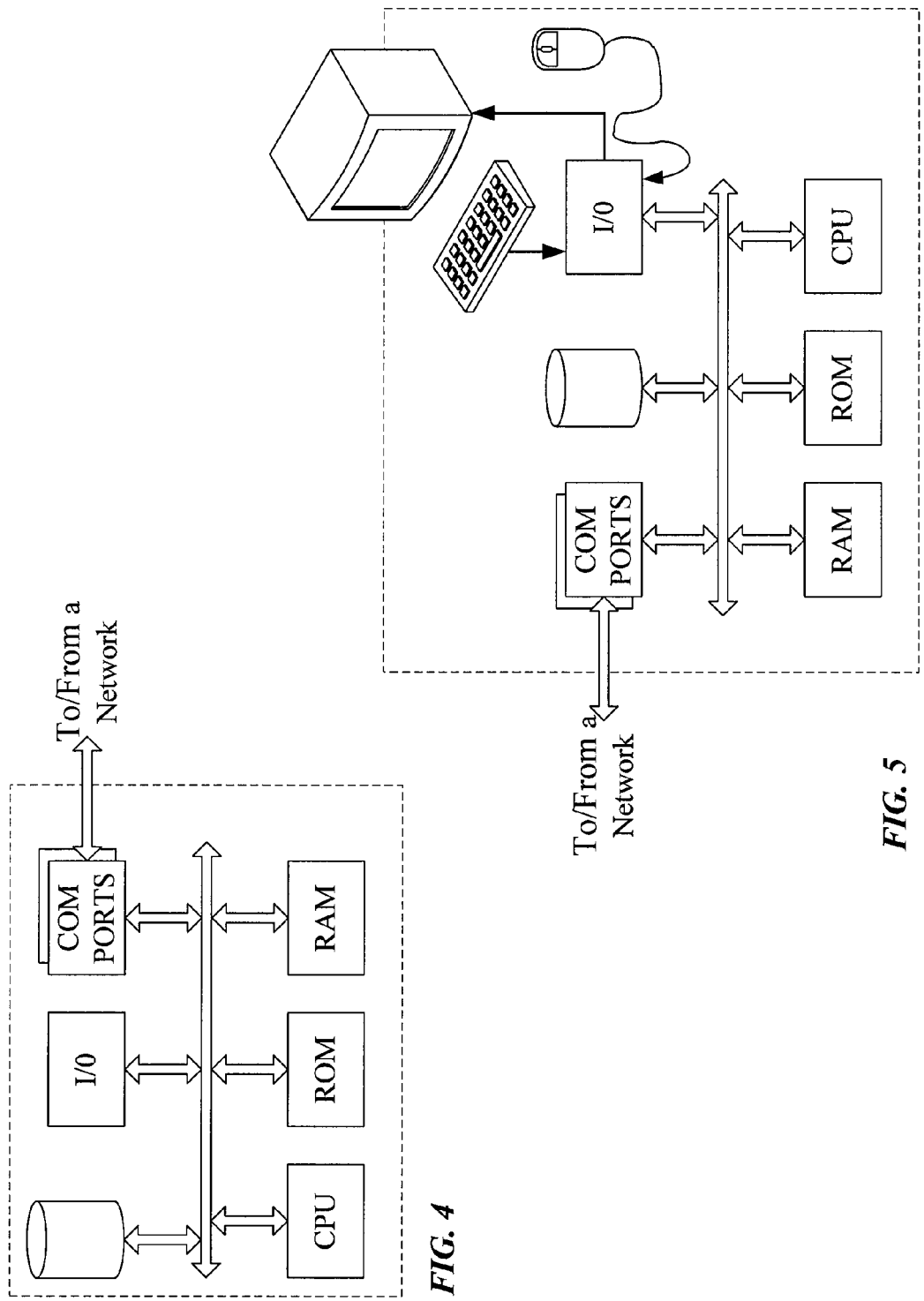
FIG. 4 is a simplified functional block diagram of a computer that may be configured as a host or server.
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server or come of the network elements (e.g., MSC 30, PDE 37, MPC 32, . . . ). FIG. 5 depicts a computer with user interface elements, as may be used to implement a personal computer (PC) or other type of work station or terminal device, although the computer of FIG. 5 may also act as a server if appropriately programmed. For example, such general purpose platforms may store the VTA 15 and load the VTA 15 into a mobile station 13, via a network communication if the platform is a server or via a local link if the platform is a PC. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of determining the location of a mobile station 13 can be executed thereon. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, the software can be communicated to the mobile station 13. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution Those skilled in the art will recognize that the present teachings are amenable to a variety of modifications and/or enhancements.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP2: 3rd generation partnership project 2
BS: base station
BTS: base transceiver system
CDMA: code division multiple access
CD-ROM: compact disc read-only memory
DVD: digital video disc
DVD-ROM: digital versatile (video) disc read-only memory
EPROM: erasable programmable read-only memory
EV-DO: evolution-data optimized
GPS: global positioning system
GSM: global system for mobile communications
HLR: home location register
IP: Internet protocol
IR: infrared
LBS: location based services
LCD: liquid crystal display
LTE: long-term evolution
MC: message center
MIN: mobile identification number
MPC: mobile positioning center
MS: mobile station
MSC: mobile switching center
PC: personal computer
PDE: position determining entity
PROM: programmable read-only memory
PSAP: public safety answering point
PSTN: public switched telephone network
RAM: random access memory
RAN: radio access network
RF: radio frequency
SMS: simple messaging service
SS7: signaling system 7
STP: signaling transfer points
TCP: transmission control protocol
TDMA: time-division multiple access
UMTS: universal mobile telecommunications system
USB: universal serial bus
VLR: visitor location register
VTA: validation test application
WAN: wide are network
WIG: wireless interne gateway
XCVR: transceiver

What is claimed is:

1. A method comprising steps of:
receiving, at a mobile station, a value for each of a plurality of call control parameters for performing a validation test of a model of the mobile station, the value for each of the call control parameters being input from an operator of the mobile station, the call control parameters including at least a duration for connecting the mobile device to a destination device during a test call, a telephone number associated with the destination device, and an indication of a number of times to perform the test call to the destination device, the received telephone number associated with the destination device including a destination telephone number associated with a location based service, the location based service including an emergency service;
automatically executing, by the mobile station via a wireless communication network, the test call the indicated number of times each for the indicated duration according to the received values for the plurality of call control parameters;
transmitting, to an element of the wireless communication network, location data associated with the mobile station during the indicated number of times of execution of the test call, to identify a location of the mobile station during the indicated number of times of execution of the test call;

recording, by the mobile station, the identified location and one or more test parameters during the indicated number of times of execution of the test call;

reporting, by the mobile station, the identified location and the one or more recorded test parameters; and validating the operability of the mobile station with the wireless communication network based on the reported one or more test parameters and the identified location of the mobile station, wherein:
validating the operability of the mobile station includes certifying that the model of the mobile station is ready for use in the wireless communication network, and certifying that the model of the mobile station includes determining an accuracy of the identified location during each executed test call associated with the location based service.

2. The method of claim 1, wherein the recording step comprises recording one or more of parameters selected from the group consisting of: whether or not each test call failed, the number of test calls attempted, a time a first of the indicated number of times of execution of the test call originated, a time when a last of the indicated number of times of execution of the test call originated, and whether or not any of the indicated number of times of execution of the test call dropped.

3. The method of claim 1 wherein the reporting step comprises displaying the one or more recorded test parameters on the display of the mobile station.

4. The method of claim 1, wherein transmitting the location data includes transmitting global positioning system (GPS) data.

5. The method of claim 1 further comprising receiving the recorded one or more test parameters from a network element of the wireless communications network prior to displaying the parameters.

6. The method of claim 1 further comprising receiving at the mobile station an application executable by the mobile station, the application configured to receive the call control parameters and automatically execute the test call the indicated number of times.

7. A mobile communications system, comprising:
a traffic network configured to support communications; and
a mobile station in communication with the traffic network, the mobile station configured to:
receive a value for each of a plurality of call control parameters for performing a validation test of a model of the mobile station, the value for each of the call control parameters being input from an operator of the mobile station, the call control parameters including at least a duration for connecting the mobile device to a destination device during a test call, a telephone number associated with the destination device, and an indication of a number of times to perform the test call to the destination device, the received telephone number associated with the destination device including a destination telephone number associated with a location based service, the location based service including an emergency service;
automatically execute the test call, via the traffic network, the indicated number of times each for the indicated duration according to the received values for the plurality of call control parameters;

transmit location data associated with the mobile station to an element of the traffic network during the indicated number of times of execution of the test call, to identify a location of the mobile station during the indicated number of times of execution of the test call;

record the identified location and one or more test parameters during the execution of the indicated number of the test calls;

report the identified location and the one or more recorded test parameters; and validate the operability of the mobile station with the traffic network based on the reported one or more test parameters and the identified location of the mobile station to certify that the model of the mobile station is ready for use in the traffic network, wherein certifying the model of the mobile station includes determining an accuracy of the identified location during each executed test call associated with the location based service.

8. The system of claim 7, further comprising a position determining element in communication with the traffic network configured to process the test calls and to record one or more test parameters during the execution of the indicated number of test calls.

9. The system of claim 7, wherein the reporting step comprises displaying the one or more recorded test parameters on the display of the mobile station.

10. The system of claim 7, further comprising a public service answer point in communication with the traffic network that is configured to receive the automatically executed test call from the mobile station.

11. The system of claim 7, wherein the mobile station is further configured to communicate the recorded test parameters to another network element.

12. The system of claim 7, wherein the test parameters are selected from the group consisting of: whether or not each test call failed, the indicated number of times of execution of the test call attempted, a time a first of the indicated number of times of execution of the test call originated, a time when a last of the indicated number of times of execution of the test call originated, and whether or not any of the indicated number of times of execution of the test call dropped.

13. An article of manufacture comprising: a non-transitory machine readable storage medium; and executable program instructions embodied in the non-transitory machine readable storage medium that when executed by a programmable system of a mobile station causes the system to perform functions that provide validation testing of the mobile station for operability of model of a mobile station to communicate via a wireless communication network, the functions comprising: receiving, at the mobile station, a value for each of a plurality of call control parameters for performing a validation test of a model of the mobile station, the value for each of the call control parameters being input from an operator of the mobile station, the call control parameters including at least a duration for connecting the mobile device to a destination device during a test call, a telephone number associated with the destination device, and an indication of a number of times to perform the test call to the destination device, the received telephone number associated with the destination device including a destination telephone number associated with a location based service, the location based service including an emergency service; automatically executing, by the mobile station, the test call the indicated number of times each for the indicated duration according to the received values for the plurality of call control parameters; transmitting location data associated with the mobile station to an element of the wireless communication network during the indicated number of times of execution of the test call, to identify a location of the mobile station during the indicated number of times of execution of the test call; recording, by the mobile station, the identified location and one or more test parameters during the execution of the indicated number of times of execution of the test call; reporting, by the mobile station, the identified location and the one or more recorded test parameters; and validating the operability of the mobile station with the wireless communication network based on the reported one or more test parameters and the identified location of the mobile station to certify that the model of the mobile station is ready for use in the wireless communication network, wherein certifying the model of the mobile station includes determining an accuracy of the identified location during each executed test call associated with the location based service.

14. The article of manufacture of claim 13, wherein the recording function comprises recording one or more of parameters selected from the group consisting of: whether or not each test call failed, the indicated number of times of execution of the test call attempted, a time a first of the indicated number of times of execution of the test call originated, a time when a last of the indicated number of times of execution of the test call originated, and whether or not any of the indicated number of times of execution of the test call dropped.

15. The article of manufacture of claim 13, wherein the reporting function comprises displaying the one or more recorded test parameters on the display of the mobile station.

16. The article of manufacture of claim 13, wherein transmitting the location data includes transmitting GPS data.

17. The article of manufacture of claim 13, wherein the recording function comprises recording, by the mobile station, the one or more test parameters.

18. The article of manufacture of claim 13, further comprising the function of receiving the recorded one or more test parameters from a network element of the wireless communications network prior to displaying the parameters.

19. A method of performing a validation test of a model of a mobile station for operability of the mobile station to communicate via a wireless communication network, the method comprising steps of:

receiving, at the mobile station, a value for each of a plurality of call control parameters for performing a validation test of a model of the mobile station, the value for each of the call control parameters being input from an operator of the mobile station, the call control parameters including at least a duration for connecting the mobile device to a destination device during a test call, a telephone number associated with the destination device, and an indication of a number of times to perform the test call to the destination device, the received telephone number associated with the destination device including a destination telephone number associated with a location based service, the location based service including an emergency service;

automatically executing, by the mobile station via the wireless communication device, the test call the indicated number of times each for the indicated duration according to the received values for the plurality of call control parameters;

recording, by the mobile station, one or more test parameters during the indicated number of times of execution of the test call;

determining a location of the mobile station, by an element of the wireless communication network, during the indicated number of times of execution of the test call;

recording, by the network element, the determined location of the mobile station during the indicated number of times of execution of the test call;

reporting the determined location and the recorded test parameters; and validating the operability of the mobile station with the wireless communication network based on the reported one or more test parameters and the reported determined location of the mobile station, wherein validating the operability of the mobile station includes certifying that the model of the mobile station is ready for use in the wireless communication network, and certifying the model of the mobile station including determining an accuracy of the reported location during each executed test call associated with the location based service.

20. The method of claim 19 wherein determining the location of the mobile station comprises determining, by a position determining entity, the location of the mobile station.

21. The method of claim 1 further comprising commercially offering the model of the mobile station for use with the wireless communication network after successful validation of the model of the mobile station.

22. The mobile communications network of claim 7 wherein the model of the mobile station is offered commercially for use with the wireless communication network after successful validation of the model of the mobile station.

23. The method of claim 19 further comprising commercially offering the model of the mobile station for use with the wireless communication network after successful validation of the model of the mobile station.

24. The method of claim 1 wherein the step of determining the accuracy of the identified location includes:

comparing the identified location with a known location of the model of the mobile station for the indicated number of times of execution of the test call; and confirming that the identified location is within a predetermined tolerance associated with the location based service.

25. The method of claim 19 wherein the step of determining the accuracy of the reported location includes:

comparing the reported location with a known location of the model of the mobile station for the indicated number of times of execution of the test call; and confirming that the reported location is within a predetermined tolerance associated with the location based service.

26. The method of claim 1 wherein the mobile station includes an application configured to receive the call control parameters and automatically execute the test call the indicated number of times, the application including functionality that untethers the mobile station from a personal computer during the step of automatically executing the test call.

* * * * *